United States Patent
Jones et al.

(10) Patent No.: US 7,548,800 B2
(45) Date of Patent: Jun. 16, 2009

(54) METHOD AND COMPUTER PROGRAM PRODUCT FOR CONTROLLING AN AERODYNAMIC VEHICLE HAVING AT LEAST ONE STRUCTURAL MODE

(75) Inventors: Richard D. Jones, Issaquah, WA (US); Thomas E. Speer, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 469 days.

(21) Appl. No.: 11/270,343

(22) Filed: Nov. 9, 2005

(65) Prior Publication Data

US 2007/0106432 A1 May 10, 2007

(51) Int. Cl.
*G01C 23/00* (2006.01)
(52) U.S. Cl. .......................................... 701/3
(58) Field of Classification Search ............ 701/3, 701/14, 1; 244/75.1, 76 R; 340/967
See application file for complete search history.

(56) References Cited

U.S. PATENT DOCUMENTS

| | | | | |
|---|---|---|---|---|
| 4,354,240 A | * | 10/1982 | Olive | ............................ 701/4 |
| 5,070,458 A | * | 12/1991 | Gilmore et al. | ................ 701/14 |
| RE35,387 E | * | 12/1996 | Strom | ......................... 244/75.1 |
| 6,591,169 B2 | | 7/2003 | Jones et al. | |
| 6,711,476 B2 | | 3/2004 | Jones et al. | |
| 6,814,330 B2 | | 11/2004 | Jones et al. | |
| 7,255,306 B2 | * | 8/2007 | Jones et al. | ................ 244/76 R |
| 7,338,018 B2 | * | 3/2008 | Huynh et al. | ................. 244/215 |

\* cited by examiner

*Primary Examiner*—Yonel Beaulieu
(74) *Attorney, Agent, or Firm*—Alston & Bird LLP

(57) ABSTRACT

Methods and computer program products are provided for controlling a plurality of control effectors of an aerodynamic vehicle based upon the mode shape direction of one or more structural modes excited by actuation of the control effectors. For example, control of the actuation of the control effectors may be provided to emphasize actuation of those control effectors that affect a structural mode having a mode shape direction that is substantially orthogonal to the mode shape of the structural mode. By affecting a structural mode in such a manner that the mode shape direction is substantially orthogonal to the mode shape of the structural mode, control structure interaction (CSI) is avoided without having to design a stiffer aerodynamic vehicle and without having to filter the sensor input and/or the actuator commands, unless it is otherwise desirable to do so.

20 Claims, 2 Drawing Sheets

METHOD AND COMPUTER PROGRAM PRODUCT FOR CONTROLLING AN AERODYNAMIC VEHICLE HAVING AT LEAST ONE STRUCTURAL MODE

FIELD OF THE INVENTION

Embodiments of the present invention relate generally to the control of a plurality of control effectors of an aerodynamic vehicle and, more particularly, to methods and computer program products for controlling an aerodynamic vehicle based upon the mode shape direction of the structural modes excited by actuation of the control effectors.

BACKGROUND OF THE INVENTION

During flight, the control of aerodynamic vehicles, such as aircraft, is principally accomplished via a variety of flight control effectors. These flight control effectors include aerodynamic controls such as the rudder, elevators, ailerons, speed brakes, engine thrust variations, nozzle vectoring and the like. By altering the various flight control effectors, the system state vector that defines the current state of the aerodynamic vehicle may be changed. In this regard, the system state vector of an aerodynamic vehicle in flight typically defines a plurality of current vehicle states such as the angle of attack, the angle of side slip, the air speed, the vehicle attitude and the like.

Historically, the flight control effectors were directly linked to various input devices operated by the pilot. For example, flight control effectors have been linked via cabling to the pedals and the control column or stick. More recently, the flight control effectors have been driven by a flight control computer which, in turn, receives inputs from the various input devices operated by the pilot. By appropriately adjusting the input devices, a pilot may therefore controllably alter the time rate of change of the current system state vector of the aerodynamic vehicle.

Actuation of the various control effectors may excite one or more dynamic structural modes of an aerodynamic vehicle. For an aircraft having a plurality of actuators disposed along the trailing edge of a wing, deflection of the actuators may create a bending moment on the wing. In this instance, the bending moment is an example of a dynamic structural mode excited by activation of the actuators. Other examples of the dynamic structural modes excited by the actuation of various control effectors of an aerodynamic vehicle include fuselage bending due to lateral loads from the vertical stabilizers.

The excitation of a dynamic structural mode may influence the control sensors that provide feedback to the flight control system. This feedback may, in turn, lead to unstable structural dynamics which may, in turn, lead to overloading of the control actuators and/or excessive structural fatigue. This phenomena is commonly termed control structure interaction (CSI).

Historically, CSI has been problematic in the development of control systems for large space structures and aerodynamic vehicles, such as commercial and military aircraft. For example, certain unmanned air vehicle development programs have required redesign of their control systems based upon CSI issues. Since the excitation of dynamic structural modes and the corresponding issues with CSI are only created by control inputs having frequencies at or near the frequencies of the structural modes, conventional techniques for addressing CSI have followed one of two paths. In one approach, the aerodynamic vehicle is designed such that the modal frequencies of the various dynamic structural modes that could otherwise be excited by actuation of the control effectors have modal frequencies that are outside the control bandwidth. In other words, the modal frequencies of the structural modes of the aerodynamic vehicle are offset from the frequency of the control inputs. In order to design an aerodynamic vehicle having modal frequencies that are outside the control bandwidth, however, the aerodynamic vehicle must generally be made quite rigid and stiff. Unfortunately, the design of a relatively rigid and stiff aerodynamic vehicle typically leads to increased weight and is oftentimes impractical.

A second approach is to utilize frequency dependent filters. These frequency dependent filters may be positioned so as to filter the signals monitored by the various control sensors such that the control sensors are not influenced by the excitation of the dynamic structural modes. Additionally or alternatively, the frequency-dependent filters may be positioned to filter the actuator commands to the control effectors such that the commands received by the various control effectors do not include frequency components at or near the modal frequencies of the various structural modes. While such filtering may at least reduce CSI issues, this filtering correspondingly reduces the performance of the flight control system by blinding the flight control system to some of the signals otherwise received by the control sensors and/or by blocking at least some of the inputs to the various control effectors. According to either approach, aerodynamic vehicles are produced that may cost more to design, but that do not perform as well.

It would therefore be desirable to avoid CSI issues that might otherwise overload the control effectors and/or may create excessive structural fatigue on an aerodynamic vehicle. However, it would be desirable to address CSI issues in a manner that does not increase the cost of an aerodynamic vehicle and does not reduce the performance of the aerodynamic vehicle.

SUMMARY OF THE INVENTION

Methods and computer program products are therefore provided for controlling a plurality of control effectors of an aerodynamic vehicle in a manner that addresses at least some of the shortcomings of the conventional approaches. In this regard, the methods and computer program products of embodiments of the present invention control the actuation of the control effectors based upon the mode shape direction of one or more structural modes excited by actuation of the control effectors. In one embodiment, for example, control of the actuation of the control effectors is provided to emphasize actuation of those control effectors whose net force effects, in combination, are substantially orthogonal to the net set of forces that would excite the structural mode. In other words, the net force effects produced, in combination, by the actuation of the control effectors is substantially orthogonal to the structural mode when the combination of net force effects produces no net forces exciting the structural mode. Such a combination of net force effects is said to have a mode shape direction that is substantially orthogonal to the mode shape of the structural mode. By affecting a structural mode in such a manner that the mode shape direction is substantially orthogonal to the mode shape of the structural mode, CSI is avoided without having to design a stiffer aerodynamic vehicle and without having to filter the sensor input and/or the actuator commands, unless it is otherwise desirable to do so.

In one embodiment, a method and computer program product for controlling a plurality of control effectors of an aerodynamic vehicle having at least one structural mode are provided. According to this embodiment, the current commanded state of a plurality of control effectors is determined. The mode shape direction of at least one structural mode is then determined based at least partially upon the current commanded state of the plurality of control effectors. In one aspect, the mode shape direction of the at least one structural mode is determined based upon a modal influence function that at least partially defines the mode shape direction of a respective structural mode excited by the actuation of respective control effectors. More particularly, the determination of the mode shape direction of the at least one structural mode may be based upon the dot product of at least a row vector representing the modal influence function and a vector representing the current commanded state of the plurality of control effectors. Based upon the mode shape direction, the plurality of control effectors may then be controlled. For example, the plurality of control effectors may be controlled based upon the mode shape direction so as to emphasize actuation of respective control effectors that affect a respective structural mode in a direction substantially orthogonal to the mode shape of the respective structural mode. Accordingly, CSI issues may be reduced, if not eliminated.

In one embodiment, a feedback signal may be provided based upon the mode shape direction of the at least one structural mode affected by the current commanded state of the control effectors. The mode shape direction for each of the plurality of structural modes may be separately determined and, for example, may be provided as separate feedback signals that collectively control the plurality of control effectors.

In one embodiment, the mode shape direction that has been determined may also be filtered based upon the modal frequency of the respective structural mode. In this embodiment, the plurality of control effectors may also be controlled so as to emphasize actuation of respective control effectors that affect a respective structural mode at a frequency offset from the modal frequency. By emphasizing those forms of control that affect structural modes at frequencies other than the respective modal frequencies, the deleterious effects of CSI are further avoided. Further, the mode shape direction may be weighted based upon a predefined criteria.

Embodiments of the methods and computer program products of the present invention control the actuation of a plurality of control effectors in such a manner so as to reduce, if not eliminate, CSI without requiring the aerodynamic vehicle to be stiffened and without degrading the performance of the aerodynamic vehicle, such as by emphasizing actuation of the control effectors that affect respective structural modes in directions substantially orthogonal to the mode shape of the respective structural modes.

BRIEF DESCRIPTION OF THE DRAWINGS

Figure 1:
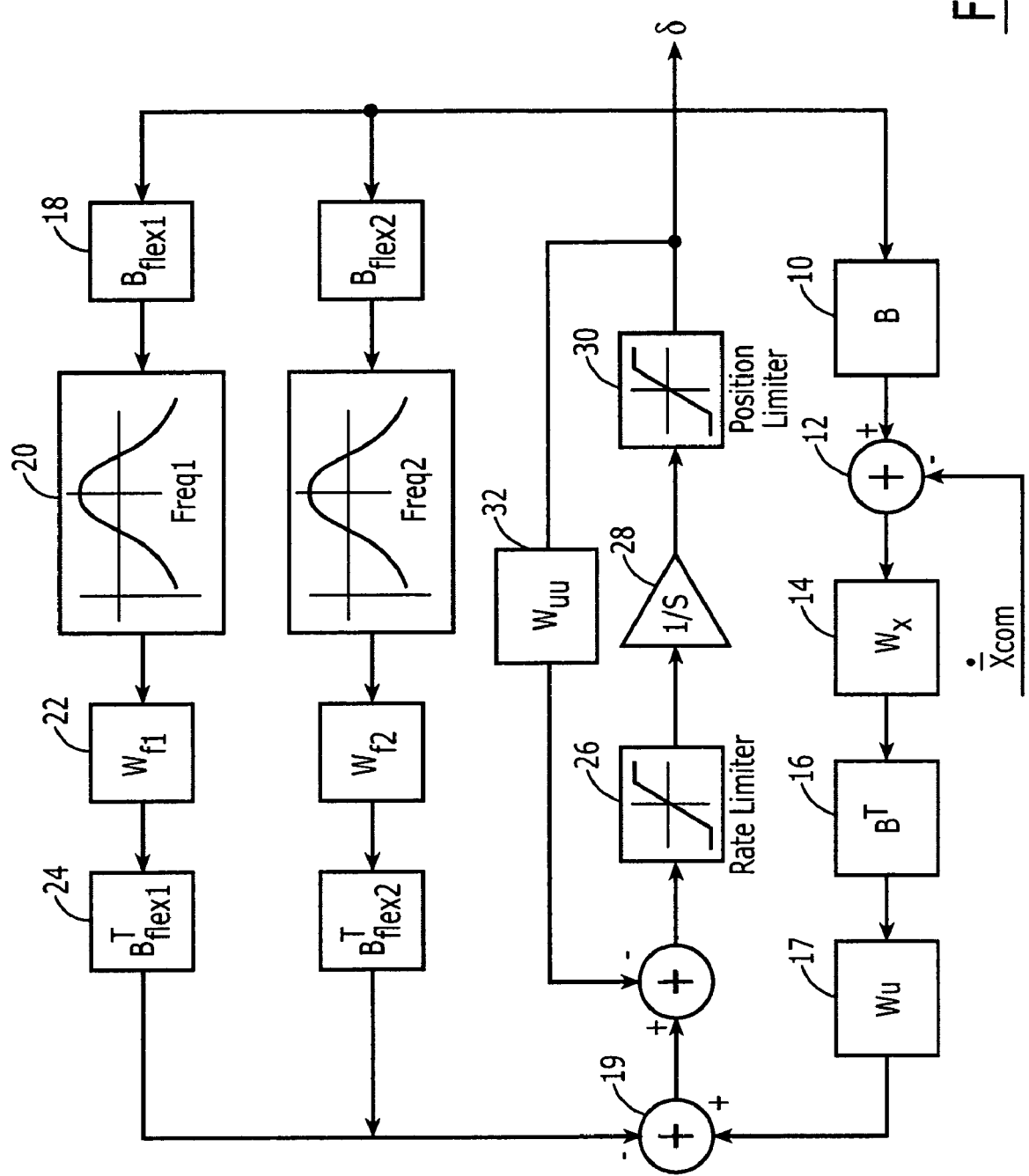
Figure 2A:
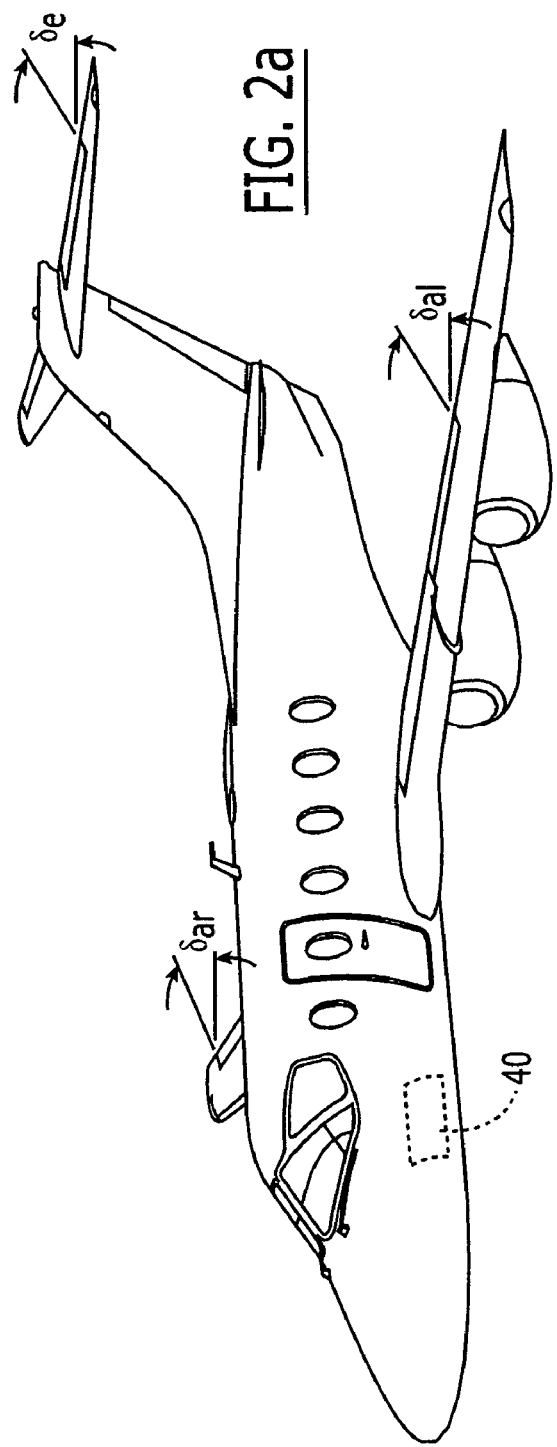
Figure 2B:

Having thus described the invention in general terms, reference will now be made to the accompanying drawings, which are not necessarily drawn to scale, and wherein:

FIG. 1 is a block diagram illustrating operations performed by the method and computer program product of one embodiment of the present invention;

FIG. 2a depicts an aerodynamic vehicle of one embodiment of the present invention having representative control effectors shown as well as an indicated location for a flight control computer implementing a control method of an embodiment of the present invention; and FIG. 2b depicts a representative mode shape direction for a longitudinal structural mode, wherein two longitudinal structural modes are shown.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method and a corresponding computer program product are provided for controlling the plurality of control effectors of an aerodynamic vehicle, such as an aircraft. As known to those skilled in the art, aerodynamic vehicles have a wide variety of control effectors with the type and number of control effectors depending upon the type and model of the aerodynamic vehicle. By way of example, typical control effectors include aerodynamic surfaces, such as the rudder, elevators and ailerons. Other control effectors include speed brakes, engine thrust variations and nozzle vectoring including the control of bi-directional nozzles.

As shown in FIG. 1 and described hereinafter, the control method may be implemented in the continuous domain utilizing analog signals. Preferably, the control method is implemented in the discrete domain utilizing digital signals. Regardless of the domain in which the control method is implemented, the control method depicted in FIG. 1 is typically automated and is generally implemented by means of a computing device, such as a flight control computer or the like. As such, the control method is typically embodied in a computer program product which directs the flight control computer to issue appropriate commands to the plurality of control effectors in order to control the aerodynamic vehicle as desired.

FIG. 2a depicts one embodiment of an aerodynamic vehicle having at least one structural mode in the longitudinal or generally nose-to-tail direction, and typically having at least two structural modes. Also shown are selected control effector deflections $\delta_{al}$, $\delta_{ar}$, $\delta_e$ that may be commanded for longitudinal control of the vehicle. FIG. 2b shows a first and second mode shape M1, M2 corresponding to two structural modes in the longitudinal direction. The effective vehicle motion and mode shape direction corresponding to these shapes are generally in the plane of the page, with embodiments of the present invention capitalizing upon commanded mode shape direction substantially orthogonal to this plane to advantageously compensate for CSI and provide enhanced vehicle performance.

It is understood that alternative embodiments of the vehicle may comprise rotary wing vehicles, unmanned fixed-wing aircraft, or missiles, for example. In addition, although longitudinal structural modes are described, application of embodiments of the present invention to other mode shapes and directions corresponding to other structural modes is readily accomplished.

As shown, the current vector of commands $\delta_C$ issued to the control effectors are monitored. The current vector of commands $\delta_C$ define the current state to which each control effector has been commanded. For example, the commands associated with an aerodynamic surface such as a rudder, elevator or aileron define the position to which the respective aerodynamic surface is currently being directed to assume. Similarly, commands may be issued to the respective engines to define the thrust to be generated and to the nozzles to define the position that the nozzles should assume. Typically, the current commands are represented by a vector $\delta_C$ which includes a term defining the state to which each respective control effector is currently commanded.

Based upon the current vector of control effector commands $\delta_C$, the anticipated changes in the plurality of states of the aerodynamic vehicle are determined. In this regard, an aerodynamic vehicle that is in flight has a number of states $\overline{X}$, including the angle of attack, the angle of side slip, the air speed, the vehicle attitude, the lift, the altitude and the like. In addition, the states of an aerodynamic vehicle that are considered by the control method may also include a plurality of engine parameters, such as temperature, pressure, total area and the like. As known to those skilled in the art, the states of an aerodynamic vehicle may vary somewhat depending upon the type and model of the aerodynamic vehicle, but are well defined for a respective type and model of aerodynamic vehicle.

In order to determine the anticipated changes in the system rate of change of the state vector $\overline{x}$ of the aerodynamic vehicle based upon the current commands $\delta_C$, a matrix B may be defined that represents changes in the rate of change of the respective states (hereinafter termed the state rates) of the aerodynamic vehicle, i.e., vehicle accelerations, in response to changes in the plurality of control effectors. See block 10 of FIG. 1. The matrix includes a plurality of terms with each term representing the change in a respective state rate of the aerodynamic vehicle in response to the change of a respective control effector. As such, the matrix represents the manner in which the aerodynamic vehicle is anticipated to respond to changes in the control effectors. Typically, the matrix is constructed to have a plurality of rows and a plurality of columns. Each column generally includes a plurality of terms, each of which defines the anticipated change in a respective state rate of the aerodynamic vehicle in response to the change in the same control effector. Thus, each column of the matrix represents the anticipated changes in the state rates of the aerodynamic vehicle due to a change of a respective control effector.

The matrix B may be constructed by a variety of techniques. In one technique, the matrix is constructed as a result of numerical calculations while in another technique, the matrix is determined based upon an analytic calculation. These techniques are described in more detail by U.S. Pat. Nos. 6,591,169; 6,711,476 and 6,814,330, the contents of each of which are incorporated herein in their entirety.

Regardless of the manner in which the matrix B is to be constructed, the matrix is preferably determined in real time based upon the current flight conditions including the dynamic pressure and the current vector of control effector commands $\delta_C$ of the aerodynamic vehicle. Following construction of the matrix, the anticipated change in each state rate of the aerodynamic vehicle is determined by the vector multiplication of the vector $\delta_C$ representing the current commands and the matrix. In particular, the dot product of the vector representing the current commands and the matrix is determined.

The desired change $\overline{x}_{com}$ in the respective state rates of the aerodynamic vehicle, i.e., the desired vehicle acceleration, is also provided, such as by pilot input, and may be stored, for example, by a conventional sample and hold circuit. This desired change $\overline{x}_{com}$ in the respective state rates of the aerodynamic vehicle may represent a change in the state rates of selected states of the aerodynamic vehicle or all of the states of the aerodynamic vehicle, typically depending upon the pilot input. In order to determine the manner in which the control effectors must be controlled in order to affect the desired change $\overline{x}_{com}$ in the respective state rates of the aerodynamic vehicle, the difference between the anticipated and desired changes in the state rates of the aerodynamic vehicle is determined. Since the desired change $\overline{x}_{com}$ in the respective state rates of the aerodynamic vehicle is also typically represented by a vector, the vector difference between the dot product representing the anticipated change in state rates of the aerodynamic vehicle and the vector representing the desired changes in the state rates is obtained as shown in block 12 of FIG. 1.

The difference between the anticipated and desired changes in the state rates of the aerodynamic vehicle may be weighted based upon a predefined criteria. One predefined criteria defines the relative importance of the respective states of the aerodynamic vehicle. Thus, the differences between the anticipated and desired changes in the state rates of the aerodynamic vehicle, typically represented as a vector difference, may be weighted so as to affect changes in some states of the aerodynamic vehicle more rapidly than other states due to the relative importance of the states for which changes are more rapidly affected. As such, a respective weight may be assigned to each state of the aerodynamic vehicle, such as during system configuration or the like, thereby defining a state weight matrix $W_x$ as shown in block 14 of FIG. 1. Typically, $W_x$ is a positive definite diagonal matrix.

These weighted differences between the anticipated and desired changes in the state rates of the aerodynamic vehicle are then converted to the corresponding changes in the control effectors to bring about the desired changes in the state rates. In the illustrated embodiment, the weighted differences are multiplied by the transpose $B^T$ of the matrix representing the changes in the state rates of the aerodynamic vehicle in response to the changes in the plurality of control effectors as shown in block 16 of FIG. 1. In other words, the dot product of the weighted vector difference and the transpose of the matrix representing changes in the state rates of the aerodynamic vehicle in response to changes in the plurality of control effectors is determined. As such, the rate of changes of the control effectors required to affect the desired changes in the state rates of the aerodynamic vehicle subject to the anticipated changes in the state rates of the aerodynamic vehicle based upon the current commanded state of each control effector is determined. Since each term of the vector difference between the anticipated and desired changes in the state rates of the aerodynamic vehicle has been weighted, the resulting commands to the control effectors to affect the desired change in the state rates of the aerodynamic vehicle are computed based upon the predetermined criteria, such as the relative importance of the respective states of the aerodynamic vehicle. By multiplying the weighted differences by the transpose of the matrix representing changes in the state rates of the aerodynamic vehicle in response to changes in the control effectors, the control method employs a gradient descent technique so as to cause the control effectors that will have the greatest impact upon effecting the desired change to be adjusted more than the control effectors that would have less impact upon effecting the desired change, thereby improving the efficiency of the control scheme by using all available effectors in a coordinated fashion.

The rate of changes of the control effectors required to affect the desired changes in the state rates of the aerodynamic vehicle may also be weighted by a penalty matrix as shown by block 17 based upon the relative or perceived importance of the respective control effectors. The penalty matrix $W_u$ is typically a positive definite diagonal matrix with one term of the matrix associated with the rate of change of each respective control effector. Typically the values of the penalty matrix are selected in advance with values larger than one serving to increase the rate of change of the respective control effector and values less than one serving to decrease the rate of change of the respective control effector.

In accordance with the illustrated embodiment of the present invention, the weighted rate of changes of the control effectors is combined with feedback signals associated with respective structural modes excited by the actuation of the control effectors. As shown in FIG. 1, each feedback loop is associated with a respective structural mode that may be excited by the actuation of some combination of the control effectors. In the embodiment of FIG. 1, two parallel feedback loops for structural modes 1 and 2, respectively, are illustrated. However, other embodiments of the method and computer program product of the present invention may include either: (i) a single feedback loop in instances in which the control effectors only excite a single structural mode or at least a single structural mode of interest or (ii) three or more feedback loops in instances in which the actuation of various combinations of the control effectors excite three or more different structural modes, the effects of each of which is represented by a respective feedback loop. For purposes of explanation but not of limitation, the feedback loop associated with the first structural mode will be described in conjunction with FIG. 1 with the feedback loops associated with any other structural modes generally having the same or comparable components.

Based upon the commanded state $\delta_C$ of the control effectors, the mode shape direction of the respective structural mode is determined. In this regard, a modal influence function, such as represented by the row vector $B_{FLEX1}$, may be defined that defines the influence of each control effector upon the resulting acceleration of the mode shape. See block 18 of FIG. 1. The modal influence function is generally defined as a result of a finite element analysis of the aerodynamic vehicle and, more particularly, as the result of a finite element analysis of the structural modes and, in particular, the mode shapes of the structural modes in response to actuation of respective ones of the control effectors. Since the modal influence function is represented by a row vector $B_{FLEX1}$ in the illustrated embodiment, the mode shape direction resulting from the commanded state $\delta_C$ of the control effectors may be established by determining the dot product of the transpose of the row vector $B_{FLEX1}$, termed $B_{FLEX1}^T$, with the row vector $B_{FLEX1}$ itself, and thereafter determining the dot product of the resulting matrix with the vector $\delta_C$ representing the commanded state of the control effectors, as shown by blocks 18 and 24 of FIG. 1.

As a result of the construction of the row vector $B_{FLEX1}$ and its matrix multiplication with its transpose $B_{FLEX1}^T$ and the commanded state $\delta_C$ of the control effectors, the resulting product defines the mode shape, including the mode shape direction, resulting from the commanded state $\delta_C$ of the control effectors with larger feedback signals being provided in instances in which the net force effect of the commanded state $\delta_C$ of the control effectors is aligned with the mode shape direction.

Since these feedback signals are ultimately subtracted from the rate of changes of the control, effectors produced by the main feedback loop as shown by block 19 of FIG. 1, the feedback signal associated with the first structural mode effectively de-emphasizes the commanded states $\delta_C$ of the control effectors that produce net force effects that, in combination, are not substantially orthogonal to the mode shape of the respective structural mode, i.e., the net set of forces that would excite the respective structural mode, since those commanded states $\delta_C$ of the control effectors would otherwise disadvantageously generate CSI. Conversely, those products of the row vector $B_{FLEX1}$, its transpose $B_{FLEX1}^T$ and the commanded state $\delta_C$ of the control effectors that result in mode shape directions that are or are nearly orthogonal to the mode shape of the respective structural mode produce smaller feedback signals. Since these feedback signals are ultimately subtracted from the rate of changes of the control effectors produced by the main feedback loop, the feedback signal associated with the first structural mode also effectively emphasizes the commanded states $\delta_C$ of the control effectors that produce net force effects that, in combination, are nearly orthogonal to the mode shape of the respective structural mode, i.e., the net set of forces that would excite the respective structural mode, since those commanded states $\delta_C$ of the control effectors do not generate much, if any, CSI.

As noted above, CSI is only occasioned by control inputs at the modal frequency, regardless of the orthogonality of the control input to the mode shape of the respective structural mode. As such, the feedback loop associated with a respective structural mode may also include a bandpass filter as shown in block 20 of FIG. 1. As the feedback signal is eventually subtracted from the rate of change of the control effectors that has been determined by the main feedback loop to affect the desired changes in the state rates of the aerodynamic vehicle, the bandpass filter is designed to selectively pass those feedback signals having a frequency at or near the modal frequency. Conversely, the bandpass filter attenuates those feedback signals having a frequency offset from the modal frequency, i.e., those signals that would not excite a structural mode and create CSI. By subtracting the feedback signal from the rate of change of the control effectors that has been determined by the main feedback loop, this design of the bandpass filter therefore effectively attenuates those control signals having a frequency at or near the modal frequency of the respective structural mode while permitting the control signals at frequencies offset from the modal frequency to be generated, thereby emphasizing the control signals at frequencies offset from the modal frequency.

As with the main feedback loop described above, the feedback signal generated by the feedback loop associated with a respective structural mode may also be weighted, such as by a weighting factor $W_{f1}$. See block 22 of FIG. 1. The weighting factor may be designed to weight the feedback signals and, therefore the mode shape direction, based upon a predefined criteria, thereby providing a relative penalty for each mode shape direction.

The weighted and filtered feedback signal representing the direction in which the respective structural mode is excited in response to the current commanded state of the control effectors, i.e., the mode shape direction, is effectively converted to corresponding changes in the control effectors necessary to excite the respective structural mode in the mode shape direction, while keeping in mind that control inputs produced as a result of the actuation of the control effectors that are substantially orthogonal to the mode shape of the respective structural mode do not excite the structural mode and are therefore not represented by the feedback signal. In the illustrated embodiment, the weighted and filtered feedback signal has also multiplied by the transpose $B_{FLEX1}^T$ of the row vector that initially determined the mode shape direction attributable to the current commanded state of the control effectors, as shown in block 24 of FIG. 1. In other words, the dot product of the weighted and filtered feedback signal and the transpose $B_{FLEX1}^T$ of the row vector $B_{FLEX1}$ is determined. As such, the rate of changes of the control effectors required to excite the respective structural mode in the mode shape direction are determined.

This feedback signal associated with the respective structural mode is then subtracted from the rate of changes of the control effectors determined by the main feedback loop as shown by block 19 of FIG. 1. By subtracting the feedback signal associated with the respective structural mode, the rate of changes of the control effectors that would have excited the respective structural mode in a non-orthogonal mode shape direction are eliminated or at least reduced or attenuated. This negative feedback thereby also effectively emphasizes the rate of changes of the control effectors that only generate control inputs to the structural mode that are orthogonal to the respective structural mode and thereby advantageously do not excite the structural mode.

In those embodiments in which the feedback signal associated with a respective structural mode has been filtered to preferentially pass those signals at or near the modal frequency of the respective structural mode, the negative feedback also eliminates or at least reduces or attenuates the rate of changes of the control effectors that would have produced control inputs to the respective structural mode at a frequency at or near the modal frequency and therefore would have excited the respective structural mode. This negative feedback thereby also effectively emphasizes the rate of changes of the control effectors that only generate control inputs to the structural mode that are at a frequency offset from the modal frequency and thereby advantageously do not excite the structural mode.

Following their combination the resulting feedback signal may be further processed. In this regard, since control effectors are typically subject to at least some limitations, such as limitations in the predefined range of the control effector and limitations in the permissible rate of change of the control effector, the method and computer program product of one advantageous aspect of the present invention limit the permissible change of each control effector that has these predefined limitations such that the resulting commands issued to the control effectors do not attempt to exceed the limitations of the control effectors. Different limitations may be imposed upon different control effectors. For example, the control signals otherwise provided to the control effectors may be limited, such as by a vector limiter as shown in block 26 of FIG. 1, to prevent the respective control effector from being commanded to change at a rate that exceeds a predefined limit. In this regard, upper and/or lower limits may be predefined such that the permissible rate of change of the respective control effector must remain within the acceptable range bounded by the limit(s).

In order to convert the rates of change $\bar{\delta}$ of the control effectors that have been determined to create the desired change in the state rates and, in turn, the state of the aerodynamic vehicle into control effector commands, the rates of change are integrated as represented by block 28 of FIG. 1. The resulting control effector commands may then be limited as represented by the limiter in block 30 of FIG. 1. This limiter serves to maintain each control effector within a predefined range. For example, the position of a nozzle or control surface may be limited so as to remain within a predefined range of positions, also typically defined by predefined upper and/or lower limits.

Once the desired changes in the control effectors have been appropriately limited so as to prevent any control effector from being commanded to exceed its predefined limitations, the changes in each control effector that have been determined to affect the desired change in the state rates of the aerodynamic vehicle are issued as commands to each of the control effectors. As such, the desired change in the state rates and, in turn, the desired change in the time rate of change of the system state vector of the aerodynamic vehicle will be affected.

Although one embodiment of the control method and computer program product has been described above, other embodiments of the control method and computer program product exist. For example, the control method and computer program product may optionally define another negative feedback loop that is designed to minimize or reduce control effector activity. In this embodiment as also shown in FIG. 1, the current commanded state of the control actuators may be weighted, such as by a matrix $W_{uu}$, designed to ultimately reduce control effector activity. See block 32. In this regard, the matrix $W_{uu}$ may be designed such that in instances in which various configurations and combinations of the control effectors could create the desired change in the state rates of the aerodynamic vehicle, those states of the control effectors in which the control effectors move more create a larger feedback signal than those states of the control effectors which require little movement of the control effectors. Typically, the matrix $W_{uu}$ is a diagonal, positive, definite matrix of small values. By multiplying the current commanded state of the control effectors by the matrix $W_{uu}$, e.g., by determining the dot product of the current commanded state of the control effectors and the matrix $W_{uu}$, another feedback signal is produced that is subtracted from the signal representative of the rate of changes of the control effectors required to affect the desired changes in the state rates of the aerodynamic vehicle. As a result of the subtraction of this additional feedback signal, the rate of changes of the control effectors that would bring about the desired changes in the state rates of the aerodynamic vehicle with less, as opposed to more, movement of the control effectors is effectively emphasized.

The feedback loop associated with a first structural mode has been described above. Although not separately described, additional feedback loops could be provided for each additional structural mode of interest. With reference to FIG. 1, for example, a second feedback loop for a second structural mode is depicted, although more or fewer feedback loops may be provided in other embodiments depending upon the number of structural modes of significance from a CSI standpoint.

Embodiments of the methods and computer program products of the present invention therefore control the actuation of a plurality of control effectors in such a manner so as to reduce, if not eliminate, CSI. Advantageously, CSI may be reduced or eliminated by the methods and computer program products of embodiments of the present invention without requiring the aerodynamic vehicle to be stiffened and without degrading the performance of the aerodynamic vehicle by, instead, emphasizing actuation of the control effectors that excite respective structural modes in directions orthogonal to the mode shape of the respective structural modes.

As indicated above, the method of controlling the plurality of control effectors of an aerodynamic vehicle may be embodied by a computer program product that directs the operation of a flight control computer 40 or the like to issue the commands to the plurality of control effectors in order to affect the desired changes. In this regard, the computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the flight control computer or the like. A typical location of a flight control computer in an avionics bay is shown in the vehicle of FIG. 2*a*.

In this regard, FIG. 1 is a block diagram, flowchart and control flow illustration of methods and program products according to the invention. It will be understood that each block or step of the block diagram, flowchart and control flow illustrations, and combinations of blocks in the block diagram, flowchart and control flow illustrations, may be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that may direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, may be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of controlling a plurality of control effectors of an aerodynamic vehicle having at least one structural mode, the method comprising:
   determining a current commanded state of the plurality of control effectors;
   determining a mode shape direction of the at least one structural mode based at least partially upon the current commanded state of the plurality of control effectors; and
   controlling the plurality of control effectors at least partially based upon the mode shape direction.

2. A method according to claim 1 wherein determining the mode shape direction comprises determining the mode shape direction of the at least one structural mode further based upon a modal influence function that at least partially defines a mode shape direction of a respective structural mode affected by actuation of respective control effectors.

3. A method according to claim 1 wherein controlling the plurality of control effectors comprises controlling the plurality of control effectors based upon the mode shape direction so as to emphasize actuation of respective control effectors that affect a respective structural mode in a direction substantially orthogonal to a mode shape of the respective structural mode.

4. A method according to claim 1 wherein determining the mode shape direction comprises separately determining the mode shape direction for each of a plurality of structural modes.

5. A method according to claim 1 further comprising filtering the mode shape direction based upon a modal frequency of the respective structural mode.

6. A method according to claim 5 wherein controlling the plurality of control effectors comprises controlling the plurality of control effectors so as to emphasize actuation of respective control effectors that affect a respective structural mode at a frequency offset from the modal frequency.

7. A method according to claim 1 further comprising weighting the mode shape direction based upon a predefined criteria.

8. A method of controlling a plurality of control effectors of an aerodynamic vehicle having at least one structural mode having a respective modal frequency, the method comprising:
   providing a modal influence function that at least partially defines a mode shape direction of a respective structural mode affected by actuation of a respective control effector;
   providing a feedback signal based at least partially upon a current commanded state of the plurality of control effectors and the modal influence function; and
   controlling the plurality of control effectors at least partially based upon the feedback signal.

9. A method according to claim 8 wherein providing the feedback signal comprises providing the feedback signal based upon a dot product of at least a row vector representing the modal influence function and a vector of the current commanded state of the plurality of control effectors.

10. A method according to claim 8 wherein controlling the plurality of control effectors comprises controlling the plurality of control effectors based upon the feedback signal so as to emphasize actuation of respective control effectors that affect a respective structural mode in a direction substantially orthogonal to a mode shape of the respective structural mode.

11. A method according to claim 8 wherein providing the modal influence function comprises separately providing a modal influence function for each of a plurality of structural modes, and wherein providing a feedback signal comprises separately providing a feedback signal for each of the plurality of structural modes.

12. A method according to claim 8 further comprising filtering the feedback signal based upon a modal frequency of the respective structural mode.

13. A method according to claim 12 wherein controlling the plurality of control effectors comprises controlling the plurality of control effectors so as to emphasize actuation of respective control effectors that affect a respective structural mode at a frequency offset from the modal frequency.

14. A method according to claim 8 further comprising weighting the feedback signal based upon a predefined criteria.

15. A computer program product for controlling a plurality of control effectors of an aerodynamic vehicle having at least one structural mode, the computer program product comprising a computer-readable storage medium having computer-readable program code embodied in said medium, the computer-readable program code, when executed by a computing device, comprising:
- a first executable portion capable of receiving signals indicative of a current commanded state of the plurality of control effectors;
- a second executable portion capable of determining a mode shape direction of the at least one structural mode based at least partially upon the current commanded state of the plurality of control effectors; and
- a third executable portion capable of providing signals utilized for controlling the plurality of control effectors at least partially based upon the mode shape direction.

16. A computer program product according to claim 15 wherein the second executable portion is capable of determining the mode shape direction of the at least one structural mode further based upon a modal influence function that at least partially defines a mode shape direction of a respective structural mode affected by actuation of respective control effectors.

17. A computer program product according to claim 16 wherein said second executable portion is further capable of determining the mode shape direction based upon a dot product of at least a row vector representing the modal influence function and a vector of the current commanded state of the plurality of control effectors.

18. A computer program product according to claim 15 wherein the second executable portion is capable of separately determining the mode shape direction for each of a plurality of structural modes.

19. A computer program product according to claim 15 further comprising a fourth executable portion capable of filtering the mode shape direction based upon a modal frequency of the respective structural mode.

20. A computer program product according to claim 15 further comprising a fourth executable portion capable of weighting the mode shape direction based upon a predefined criteria.

* * * * *